INVENTORS
Ronney R. Koch
Joseph Ramos
BY
ATTORNEY

INVENTORS
Ronney R. Koch
Joseph Ramos
BY
ATTORNEY

United States Patent Office 3,237,691
Patented Mar. 1, 1966

3,237,691
METHOD OF CONSOLIDATING SANDS,
EARTHEN FORMATIONS AND THE LIKE
Ronney R. Koch and Joseph Ramos, Duncan, Okla.,
assignors to Halliburton Company, Duncan, Okla., a
corporation of Delaware
Filed Apr. 16, 1965, Ser. No. 453,536
16 Claims. (Cl. 166—33)

This application is a continuation-in-part of application Serial No. 160,283, filed December 18, 1961, now abandoned and is entitled to the benefits of said earlier filed application as to all common subject matter.

The present invention relates to a new and improved method of consolidating sands, earthen formations and the like.

The present invention particularly relates to a new and improved method for controlling acid reaction on carbonates and/or calcareous materials while shutting off water inflows in treating well formations with acid-set resins.

In using acid-set water soluble resins and resin forming materials for consolidating earthen formations and for water shut-off operations in oil wells, and when the formation to be treated contains carbonate and/or calcareous materials, it has heretofore been necessary to preflush such formations with acid. This requires two independent placement operations, i.e. first placing or introducing an acid into the formation, and secondly, introducing the desired acid-set resin into the formation. Such an initial acid treating or preflush operation is time consuming and thus increases the overall cost of using an acid-set resin in such formation.

The present invention overcomes this problem by reducing the acid reaction on the carbonates and/or calcareous materials and thereby eliminating the necessity of the preflush placement operation or step.

It is therefore an important object of the present invention to provide a new and improved earthen formation treating acid-set resin composition which obviates first treating the formation with acid and which may therefore be more economically employed in such formation treating operations.

Another object of the present invention is to provide a new and improved earthen formation treating composition comprising a mixture of a material selected from the group consisting of magnesium chloride, calcium chloride, sodium chloride or mixtures thereof, a water-soluble acid-set resin and a suitable catalyst for the resin.

Still another object of the present invention is to provide a new and improved composition for treating or consolidating earthen formations, comprising a mixture of a urea-formaldehyde resin and a material selected from the group consisting of magnesium chloride, calcium chloride, sodium chloride, or mixtures thereof.

Other objects and advantages of the present invention will be more readily apparent from a reading of the specification and claims set forth heerinafter.

The invention will be more readily understood from a reading of the following specification and by reference to the accompanying drawings forming a part thereof, wherein examples of the present invention are shown, and wherein.

In the illustrations, the various materials or ingredients are added in the order listed.

Figure 1:
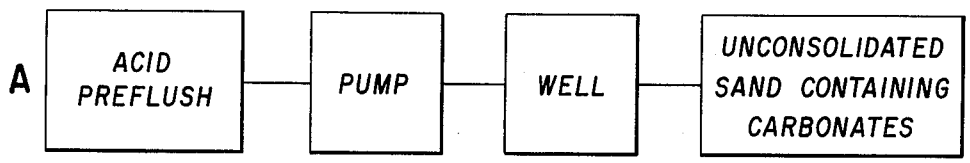
FIG. 1 is a block or flow diagram broadly illustrating the two step method, A and B, of the prior art, for consolidating loose sands containing carbonates.
Figure 1:
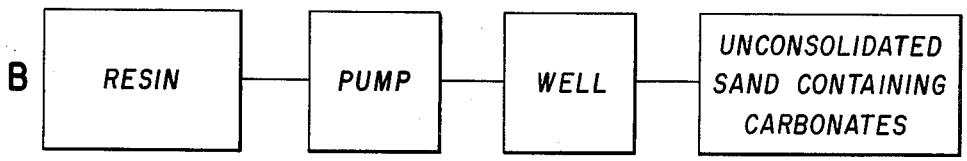
Figure 2:
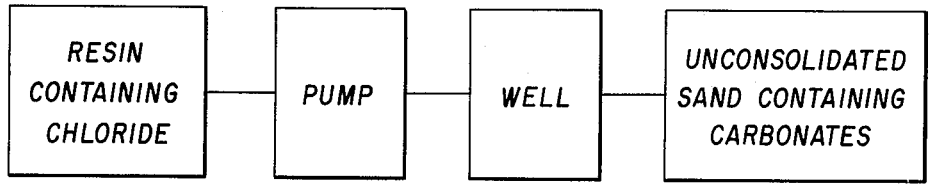
FIG. 2 is a block or flow diagram broadly illustrating the one step method of the present invention of consolidating loose sands containing carbonates.
Figure 3:
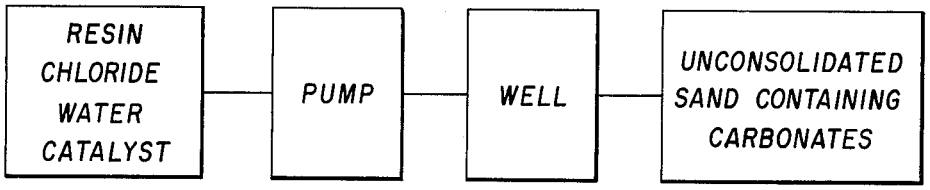
FIG. 3 is a block or flow diagram illustrating broadly the batch method of the present invention.

In FIGS. 1 and 2 of the drawings, it should be understood that a suitable catalyst is added to the resin or resin solution at some time prior to the injection of the resin into the formation to be consolidated.

Figure 4:
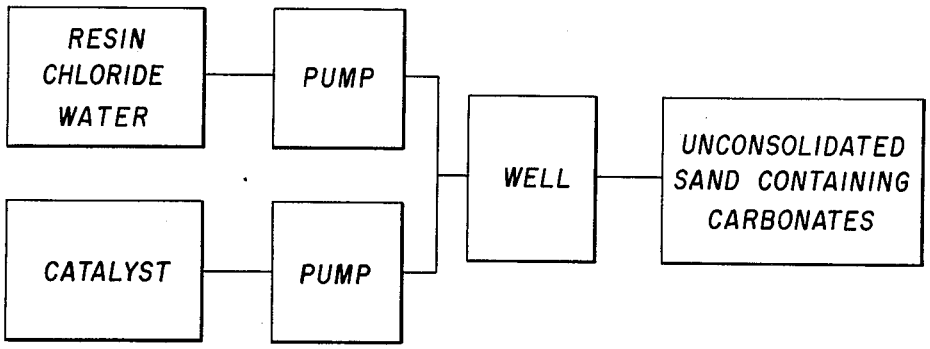
FIG. 4 is a block or flow diagram illustrating broadly the two stream method of the present invention.
Figure 5:
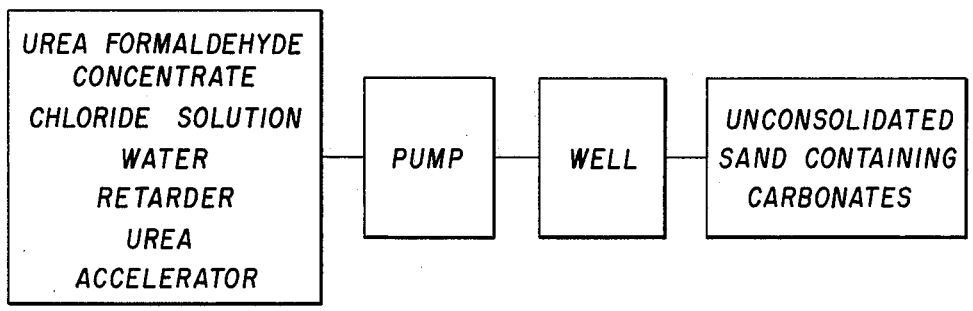
FIG. 5 is a block or flow diagram illustrating a particular form of the batch method of the present invention, using a urea-formaldehyde resin.
Figure 6:
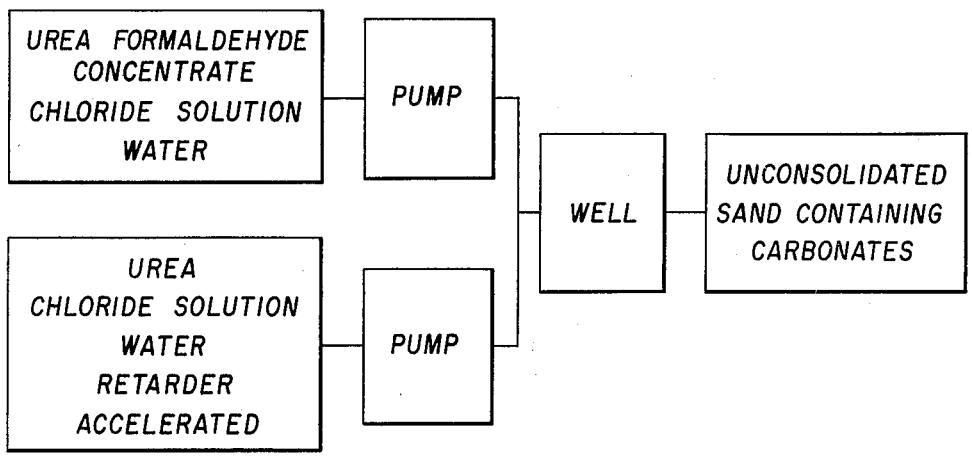
FIG. 6 is a block or flow diagram illustrating a particular form of the two stream method, using a urea-formaldehyde resin.

In FIGS. 4 and 6, the catalyst may be added to the resin at any time prior to the injection of the resin or resin solution into the formation to be consolidated. This, of course, includes the mixing of the resin and catalyst before or at the well head, down the well bore, just prior to entering the formation to be consolidated, or at any desired intermediate point.

In FIGS. 2, 3, 4, 5 and 6, it should be understood that the chloride is added to the resin or resin solution in addition to any catalyst necessary to provide the desired acid setting of the resin.

It has been discovered in using acid-set resins or resin forming materials for consolidating earth formations or in well treating operations, that the addition of a quantity of a material selected from the group consisting of magnesium chloride, calcium chloride, sodium chloride, or mixtures thereof to the resin, before injecting or introducing the resin into the formation, will cause or enable the resin to set properly even though such formation may contain carbonates or be calcareous. These chlorides, of which magnesium chloride is preferred, are preferably added prior to adding any water in order to achieve a more desirable dispersion of the chloride in the resin. It appears that these particular chlorides, when incorporated in the acid-set resin formulation, reduce the acid reaction on carbonates and/or calcareous materials, thereby allowing the acid-set resin to properly set. It should be noted that the amount of such chlorides required to be added to the resin to give the desired results is determined by the amount of carbonates and/or calcareous material in the formation being treated. This amount can be quickly and easily determined by anyone skilled in the art.

In performing the method of the present invention, it is preferred that the chloride be added to the acid-set water soluble resin at the well site or earth treating site, mixed therewith, and then the entire resinous solution injected into the well.

Although not wishing to be bound specifically thereby, it is believed that the following ionic equations, wherein magnesium chloride is used, illustrate the mechanism by which the acid is formed which sets the resin:

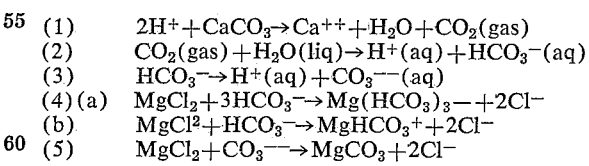

(1) $2H^+ + CaCO_3 \rightarrow Ca^{++} + H_2O + CO_2(gas)$
(2) $CO_2(gas) + H_2O(liq) \rightarrow H^+(aq) + HCO_3^-(aq)$
(3) $HCO_3^- \rightarrow H^+(aq) + CO_3^{--}(aq)$
(4)(a) $MgCl_2 + 3HCO_3^- \rightarrow Mg(HCO_3)_3^- + 2Cl^-$
(b) $MgCl_2 + HCO_3^- \rightarrow MgHCO_3^+ + 2Cl^-$
(5) $MgCl_2 + CO_3^{--} \rightarrow MgCO_3 + 2Cl^-$ aq=aqueous
Liq=liquid In Equation 1 the $H^+$ is supplied by the acid of the reaction of the ammonium salt and formaldehyde when using a urea-formaldehyde resin. The other equations (reactions) then follow. Equations 4(a) and (b) can both exist simultaneously, and as a matter of fact, they both probably do exist at the same time. It should be noted that these reactions occur simultaneously. The formation of Equations 4(a) and (b) and 5 reduce the amount of $CO_2$ evolved in Equation 1 and allow the solution to remain acid long enough to set the resin.

When calcium chloride is used in lieu of the magnesium chloride, the common ion effect is applicable as well as the complex ion effect. In this instance the calcium chloride has an ion, $Ca^{++}$, common with the $Ca^{++}$ ion of calcium carbonate thereby reducing the solubility of the latter. This is illustrated by the equation:

(1) $CaCl_2 \rightarrow Ca^{++} + 2Cl^-$
(2) $H^+ + CaCO_3 \rightarrow Ca^{++} + CO_2 + H_2O$ By the common ion effect, the $Ca^{++}$ in Equation 2 is reduced. The balance of the equations which follow are similar to those using the magnesium chloride as shown above.

Numerous laboratory tests have been made testing the composition and method of the present invention. Some typical results of these tests, wherein the batch method of preparation was used and which is described in a copending application, U.S. Serial No. 129,972, filed August 8, 1961, now U.S. Patent No. 3,176,471, and which is explained in more detail hereinafter and wherein 1 gm. of ammonium sulfate was used as the accelerator and 7 cc. of ammonium hydroxide was used as the retarder, are as follows: The ammonium sulfate and the ammonium hydroxide are in effect substitutes for ammonium chloride and hexamethylenetetramine, respectively.

*Test 1.*—An 8-inch tube was packed with a 4% carbonate sand. This was squeezed at room temperature with a solution consisting of 1.92:1 formaldehyde to urea ratio, 52.5% solids, based on formaldehyde and urea, and 30 grams of $MgCl_2.6H_2O$. Approximately 3 inches of this sand was consolidated.

*Test 2.*—Another sample of the 4% carbonate sand was placed into a chamber and a solution consisting of 1.92:1 formaldehyde to urea ratio, 52.5% solids based on formaldehyde and urea with 50 grams of $MgCl_2.6H_2O$ was squeezed into the core at 180° F. The core was closed in at 600 p.s.i. After 17 hours the shut-in pressure was 200 p.s.i. A good consolidation was obtained, but no compressive strengths were run.

*Test 3.*—A third sample of the 4% carbonate sand was placed into the chamber used in Test 2, and the same formula was used to squeeze this sample at 160° F. The sample was shut in at 500 p.s.i. After 16 hours, the shut-in pressure was 100 p.s.i. A good set was obtained, but again compressive strengths were not run.

*Test 4.*—A sample of 4 percent carbonate sand was placed into a Hassler sleeve and squeezed with a solution consisting of 1.92:1 formaldehyde to urea ratio, 52.5 percent solids based on formaldehyde and urea, with $MgCl_2.6H_2O$ absent. An overburden pressure of 500 p.s.i. with no shut-in pressure was used. This sample was allowed to cure 20 hours at 150° F. There was no consolidation.

*Test 5.*—A sample similar to that used in Test No. 4 was placed into the Hassler sleeve and treated with the same formulation with the exception that 25 grams of $MgCl_2.6H_2O$ was added thereto. The core was consolidated, but its compressive strength was less than 10 p.s.i.

*Test 6.*—A 42 mm. glass tube 8 inches long was packed with 4 percent carbonate sand. This sand was squeezed with a solution similar to the one used in Test 5. The tube was shut-in at 25 p.s.i. After curing 22 hours at 150° F., the core was consolidated, but its compressive strength was less than 10 p.s.i.

*Test 7.*—A sample similar to that used in Test 4, and using a similar formulation except that 50 grams of $MgCl_2.6H_2O$ was added thereto, was tested. The formation was squeezed into the 4 percent carbonate sand in the Hassler sleeve with 500 p.s.i. overburden pressure but no shut-in pressure. After curing the sample 72 hours at 150° F., the sand was completely consolidated and the compressive strength was 27.5 p.s.i. The injection rate into the core before treatment at 250 p.s.i. was 6 cc./min. After treatment, the injection rate at 300 p.s.i. was 3 cc./min.

*Test 8.*—The formulation used in Test 4 except that 140 grams $MgCl_2.6H_2O$ was added thereto, was squeezed into a 42 mm. glass tube 8 inches long containing 4 percent carbonates. This was allowed to cure 72 hours at 150° F., after which the sand was completely consolidated and the compressive strength was 178 p.s.i. Injection rates before treatment were 15.4 cc./min. at 25 p.s.i. After treatment, there was no production at 25 p.s.i These tests are indeed significant in that it had not been previously possible to set the urea formaldehyde resin in this carbonate sand in the absence of the magnesium chloride. It can readily be seen that the addition of magnesium chloride to the water soluble, acid-set resin greatly improves the condition of carbonate sands.

These controlled tests indicate that the addition of magnesium chloride considerably enhances the strength of water-soluble, acid-set resins in carbonate sands.

The above tests are summarized in the following table:

TABLE I

| Test No. | Carbonates (percent) | MgCl² (grams) | Compressive Strength | Temp. (° F.) | Results |
|---|---|---|---|---|---|
| 1 | 4 | 30 | Not run | Room | Partially consolidated. |
| 2 | 4 | 50 | do | 180 | Completely consolidated. |
| 3 | 4 | 50 | do | 160 | Do. |
| 4 | 4 | 0 | None | 150 | No consolidation. |
| 5 | 4 | 25 | 10 p.s.i | 150 | Completely consolidated. |
| 6 | 4 | 25 | 10 p.s.i | 150 | Do. |
| 7 | 4 | 50 | 27.5 p.s.i | 150 | Do. |
| 8 | 4 | ¹ 140 | 178 p.s.i | 150 | Do. |

¹ This is considered maximum $MgCl^2.6H^2O$ concentration.

Another series of laboratory tests were made wherein a 6-inch tube was packed with a 6 percent carbonate sand. The sand was preflushed with 138 cc. of standard brine solution in each instance to assure that the sand samples were substantially free of contamination and uniform. This step would of course not be necessary in actual formation treating operations. The sand was then squeezed at room temperature with a solution containing 132 gms. of UF-85 (a urea-formaldehyde resin concentrate sold commercially by Allied Chemical and Dye Corporation under the trade name of U.F. Concentrate-85), 47.2 gms. of urea, 7 ccs. of ammonium hydroxide, and certain variables as shown with the results of such tests in the table as follows:

TABLE II

| Test No. | CaCl₂ (100 g. CaCl₂/100 cc. H₂O) (cc.) | NaCl (100 g. NaCl/300 cc. H₂O) (cc.) | MgCl₂ (200 g. MgCl₂/100 cc. H₂O) (cc.) | (NH₄)₂SO₄ (gms.) | NH₄Cl (gms.) | Average Comp. Strength (p.s.i.) |
|---|---|---|---|---|---|---|
| 9 | 108 | | | | 1 | 335 |
| 10 | 108 | | | | 1 | 346 |
| 11 | 10 | | 98 | 1 | | 159 |
| 12 | 10 | | 98 | 1 | | 207 |
| 13 | | | 108 | 1 | | ¹ None |
| 14 | 10 | 98 | | | 1 | 278 |
| 15 | 10 | 98 | | | 1 | 302 |
| 16 | | 108 | | | 1 | ¹ None |

¹ Consolidated.

Additional laboratory tests were made on higher strength carbonates, similar to those summarized in Table II, wherein a solution was used containing 132 grams of UF–85, 47.2 grams of urea, 1 gram of ammonium sulfate with certain variables and results as indicated in the following table:

TABLE III

| Percent Carbonates | Temp. (° F.) | CaCl$_2$ (100 g. CaCl$_2$/100 cc. H$_2$O) (cc.) | NaCl (100 g. NaCl/300 cc. H$_2$O) (cc.) | MgCl$_2$ (200 g. MgCl$_2$/100 cc. MgCl$_2$.6H$_2$O) (cc.) | NH$_4$OH (cc.) | Average Comp. Strength (p.s.i.) |
|---|---|---|---|---|---|---|
| 100 | 150 | 10 | 98 |  | 7 | 298 |
| 100 | 150 |  |  | 108 | 7 | 73.8 |
| 10 | 100 | 10 | 98 |  | 3 | 18.0 |

Carbonates in the form of large, small and fine marble chips were used. In the case of the 10 percent carbonates test, the marble used was the same sieve size as the sand.

In performing the method of the present invention, any water solubile, acid-set resin may be used and such resin may be prepared in a conventional or well-known manner. Some examples of water soluble acid set resins or resin systems are phenol-formaldehyde, urea-formaldehyde, furfuryl alcohol and urea-formaldehyde-furfuryl alcohol resin.

Several methods of preparing a urea-formaldehyde resin are disclosed in the copending application, Serial No. 129,972.

"Batch" method

In the batch method, the concentrate is dissolved in water, mixed in a single container, and injected into the earth formation to be grouted or sealed by a single pump. Water for dissolving the concentrate is normally available at the operating site.

A typical example of preparing a 100 gallon resin solution for grouting or other earth injection is as follows:

(1) 49 gallons of water are placed in a suitable container, to which, (2) 142 pounds of urea are mixed therewith.

(3) 33.4 pounds of ammonium chloride are added and mixed in the solution as an accelerator or catalyst.

(4) In order to control the setting time of the resin, predetermined amounts of a retarding agent such as ammonium hydroxide or hexamethylenetetramine (HMT) are added to the mixture. The HMT acts as a retarding agent and the more HMT added to the solution, the longer the "cloud time." "Cloud time" is the amount of time it takes the clear solution to begin to have a cloudy appearance. Setting or hardening of the resin follows soon after "cloud time"; thus "cloud time" is a warning signal that the resin is about to harden. "Cloud time" graphs or charts for various temperatures are easily prepared and can be used by an operator to quickly and easily determine the amount of retarding agent and accelerator to be added to the solution to cause the setting of the resin to occur after a pre-determined amount of time has elapsed.

(5) 36.4 gallons of concentrate is added and mixed with the solution. This is the last step in the mixing operation and "cloud time" begins at this stage. The resin solution is then pumped or otherwise injected into the cavity to be plugged or formation to be consolidated. The resin is then allowed to set.

Two stream continuous system

One of the advantages of using the concentrate is that it is only mildly corrosive and may be used with standard containers and pumping units. In the "two stream continuous system," two separate solutions, e.g., A and B, are prepared of approximately equal volumes and pumped through separate lines so that no mixing occurs until the two streams are joined together at the well head or other mixing site. Setting or "cloud time" begins when the two solutions are mixed together. In preparing two solutions of 50 gallons each, the following is a typical example:

*Solution A.*—36.4 gallons of concentrate is added to 13.6 gallons of water in a suitable container and mixed together.

*Solution B.*—To 35.5 gallons of water in a separate suitable container are added 142 pounds of urea and 33.4 pounds of ammonium chloride, which are mixed in the solution as added. HMT is added in the predetermined desired amount.

Each of the solutions is then pumped simultaneously through separate lines so as to meet at the well head for mixing together. "Cloud time" begins as the two solutions are mixed with each other. The mixture of A and B is then injected into the formation to be grouted or otherwise treated and then allowed to set or harden.

Suitable substitutions for the retarder, hexamethylenetetramine, are triethylamine or other tertiary amines, secondary and primary amines, and disodium hydrogen phosphate or other buffering salts that do not raise the pH above 8 or 9 so that an undesirable precipitate of dimethylolurea is produced.

Suitable substitutions for the accelerator or catalyst, ammonium chloride, are ammonium salts of strong acids such as ammonium sulfate, ammonium nitrate, etc. For relatively quick sets, mineral acids, such as hydrochloric, nitric, sulfuric, etc., may be applied directly. For slower sets, weak acids such as acetic acid may be used, as well as other organic acids, e.g. benzenephosphonic acid.

It should be understood that the instant invention is the addition of certain chlorides, namely magnesium chloride, calcium chloride, sodium chloride, or mixtures thereof, to an acid settable resin or resin formulation, in addition to a catalyst for the resin system, for suppressing the reaction of acid on carbonates in an acid set resin system.

Although certain preferred catalysts and certain preferred resin or resin systems have been set forth herein, the invention is not limited to the use of any particular catalyst or any particular resin. The resin, of course, must be an acid set or acid settable one, and the catalyst should be one suitable for catalyzing the resin chosen.

The urea-formaldehyde resin concentrate used hereinabove is sold commercially by Allied Chemical and Dye Corporation under the trade name of U.F. Concentrate–85 and by Hercules Powder Company under the trade name of UFC–8545. Such concentrate is a solution of formaldehyde and urea reacted in a small amount of water. It contains about 85% solids combined in a formaldehyde to urea mol ratio of about 4.8 to 1. A typical sample of the concentrate contains about 60% formaldehyde and 25% urea.

For all practical purposes, the two products UF Concentrate 85 and UFC–8545 are the same. The properties of each are essentially the same and the reactions of the two materials are almost identical. The formaldehyde to urea ratio is slightly higher in the UF Concentrate 85 than the concentrate UFC–8545.

Properties of the concentrates as claimed by the manufacturers are as follows:

|  | UF Con. 85 | UFC-8545 |
| --- | --- | --- |
| Formaldehyde, percent by wt | 59 | 57-61 |
| Urea, percent by wt | 26 | 24-28 |
| Solids, percent by wt | 85 | 85 min. |
| Formaldehyde: Urea mol ratio | 4.6:1 | 4.5:1 |
| Color APHA | 10 max | 15. |
| pH as produced | 8.0 approx | 8.5. |
| Viscosity at 25° C, cps | 300 max | 300. |
| Buffer capacity | 15.0 max | 15. |
| Methanol, percent by wt | 0.3 max | |

These liquid concentrates offer the highest solids content consistent with an easy-to-handle liquid form which is of a high purity and stable in storage. It should be understood that although the concentrates set forth above are particularly useful in the present invention, the invention is not limited to the use of such specific concentrates and any other suitable urea-formaldehyde concentrates may be used without departing from the scope of the invention.

The term urea-formaldehyde concentrate or concentrate as used throughout the specification and claims refers to the concentrate or concentrates identified as UFC-8545 and UF Concentrate 85 or any other similar urea-formaldehyde concentrate having a high percentage of solids content.

In preparing a magnesium chloride-resin mixture of the invention or other chloride resin mixture, it is preferred that the water be added to the resin after the magnesium chloride or other suitable chloride has been added thereto and thoroughly mixed therewith. This assures that the maximum effective amount of the chloride is dispersed in the resin. In this respect, it has been determined that the optimum ratio of magnesium chloride to water is two parts of magnesium chloride by weight to one part of water by weight. Optimum amounts of calcium chloride and sodium chloride are one part of calcium chloride to one part of water by weight, and one part of sodium chloride to three parts by weight of water, respectively.

When the urea-formaldehyde resin contains about 52.5 percent solids, about 4.2 pounds of magnesium chloride are preferably added for each gallon of the liquid resin.

In using such an acid-set resin in treating carbonate or calcareous earth formations, it is normally sufficient that the resin become polymerized. Any polymerization will provide the necessary stabilization of the formation, especially when such formation is in a confined location or area. Accordingly, no compressive strength is required for a normal formation treating. If higher compressive strengths are required suitable additives may be used.

Broadly, the present invention relates to a composition and method for treating calcareous or carbonate earth formations wherein in addition to the catalyst for setting a resin, certain chlorides, magnesium, calcium and sodium, are mixed with a water soluble acid-set resin to enable the resin to polymerize in such formations.

Although the present invention is particularly adapted for consolidating formations or sands containing carbonates, it can be used in non-calcareous formations. The flexibility of the invention in functioning in both calcareous and non-calcareous environments is an important feature of the invention.

The foregoing disclosure and description of the invention is illustrative and explanatory thereof and suitable variations may be made within the scope of the appended claims without departing from the spirit of the invention.

What is claimed is:

1. A method of consolidating sands, earthen formations and the like all of which contain calcareous materials, comprising the step of: introducing into the medium to be consolidated an acid-settable resin solution containing a catalyst for producing an acid set of the resin solution and in addition to said catalyst, a quantity of a chloride selected from the group consisting of magnesium chloride, calcium chloride, sodium chloride and mixtures thereof, said chloride being present in an amount sufficient for reducing acid reaction on any calcareous sands present thereby enabling the acid-settable resin solution to properly set.

2. A method of consolidating sands, earth formations and the like all of which contain calcareous materials, comprising the step of: introducing into a medium to be consolidated, an acid-set resin solution containing a quantity of a chloride selected from the group consisting of magnesium chloride, calcium chloride, sodium chloride and mixtures thereof, said chloride being present in an amount sufficient for reducing acid reaction on any calcareous formations thereby enabling the acid-set resin solution to properly set, and a quantity of a catalyst other than careous formations thereby enabling the acid-set resin solution.

3. A method of consolidating sands, earthen formations and the like, comprising the steps of: mixing a water soluble acid-set resin, a chloride selected from the group consisting of magnesium chloride, calcium chloride, sodium chloride and mixtures thereof, said chloride being present in an amount sufficient for reducing acid reaction on any calcareous sands present thereby enabling the acid-set resin to properly set, and water, said chloride being present in an amount sufficient for reducing acid reaction on any calcareous sands present thereby enabling the acid-set resin to properly set, to form a resin-chloride-water solution; adding to said resin-chloride-water solution a catalyst other than said chloride for producing an acid set of said resin solution; then introducing the resin-chloride-water-catalyst solution into the medium to be consolidated; and, allowing the latter solution to set, thereby forming a hard impermeable mass.

4. A method of consolidating sands, earthen formations and the like traversed by a well bore, comprising the steps of: mixing a water soluble acid set resin, a chloride selected from the group consisting of magnesium chloride, calcium chloride, sodium chloride and mixtures thereof, said chloride being present in an amount sufficient for reducing acid reaction on any calcareous sands present thereby enabling the acid-set resin to properly set, and water, in the order stated, to form a resin solution suitable for injection into a formation; adding to the resin solution at any point prior to injection in the formation, a catalyst other than said chloride for producing an acid-set of the resin; introducing the latter solution into the medium to be consolidated; and allowing the resin to set, thereby forming a hard impermeable mass.

5. A method of consolidating sands, earthen formations and the like, containing calcareous materials, comprising the step of: introducing into the medium to be consolidated a resin solution containing an acid-settable resin, a catalyst for producing an acid-set of the resin, and a chloride in an amount sufficient for suppressing the reaction of acid on the calcareous materials in the formation, thereby enabling the catalyst to produce an acid-set of the resin and form a hard impermeable mass.

6. The method of claim 5, wherein the chloride is selected from the group consisting of magnesium chloride, calcium chloride, sodium chloride and mixtures thereof.

7. A method of consolidating sands and other earthen formations containing carbonates or calcareous materials, comprising the steps of: preparing a liquid water-soluble acid-set resin, adding a predetermined amount of a chloride selected from the group consisting of magnesium chloride, calcium chloride and sodium chloride to said liquid resin and mixing therewith, said chloride being present in an amount sufficient for reducing acid reaction on the calcareous materials thereby enabling the acid-set resin to properly set, adding a predetermined amount of water to the resin and chloride mixture, adding a suitable catalyst for producing an acid set of said resin, introducing said mixture into the medium to be treated, and allowing the mixture to set a predetermined length of time thereby allowing the polymerization of the resin and the stabilization of the sand.

8. The method of claim 7, wherein the water-soluble, acid-set resin is a urea-formaldehyde resin.

9. A method of consolidating sands and other earthen formations containing carbonates or calcareous materials, comprising the steps of: preparing a liquid urea-formaldehyde resin, adding a predetermined amount of furfuryl alcohol to said resin, adding a predetermined amount of a chloride selected from the group consisting of magnesium chloride, calcium chloride, sodium chloride, said chloride being present in an amount sufficient for reducing acid reaction on the calcareous materials thereby enabling the acid-set resin to properly set, and mixtures thereof to said resin and mixing therewith, adding a predetermined amount of water to the resin mixture, adding a suitable catalyst for producing an acid set of said resin, introducing said mixture into the medium to be treated, and allowing the mixture to set a predetermined length of time thereby allowing the polymerization of the resin and the stabilization of the sand.

10. A method of consolidating sands and other earthen formations containing carbonates or calcareous materials, comprising the steps of: preparing a liquid water-soluble acid-set resin, adding a predetermined amount of magnesium chloride to said liquid resin and mixing therewith, said chloride being present in an amount sufficient for reducing acid reaction on the calcareous materials thereby enabling the acid-set resin to properly set, adding a predetermined amount of water to the resin and magnesium chloride mixture, adding a suitable catalyst for producing an acid set of said resin, introducing said mixture into the medium to be treated, and allowing the mixture to set a predetermined length of time thereby allowing the polymerization of the resin and the stabilization of the sand.

11. The method of claim 10, wherein the water-soluble, acid-set resin is a urea-formaldehyde resin.

12. A method of consolidating sands and other earthen formations containing carbonates or calcareous materials, comprising the steps of: preparing a liquid urea-formaldehyde resin, adding a predetermined amount of furfuryl alcohol to said resin, adding a predetermined amount of magnesium chloride to said resin and mixing therewith said chloride being in an amount sufficient, adding a predetermined amount of water to the resin mixture, adding a suitable catalyst for producing an acid set of said resin, introducing said mixture into the medium to be treated, and allowing the mixture to set a predetermined length of time thereby allowing the polymerization of the resin and the stabilization of the sand.

13. A method of consolidating sands and other earthen formations containing carbonates or calcareous materials, comprising the steps of: preparing a liquid water-soluble acid-set resin, adding a predetermined amount of a chloride selected from the group consisting of magnesium chloride, calcium chloride and sodium chloride to said liquid resin and mixing therewith, said chloride being present in an amount sufficient for reducing acid reaction on the calcareous materials thereby enabling the acid-set resin to properly set, adding a predetermined amount of water to the resin and chloride mixture, introducing said mixture into the medium to be treated, introducing into the earthen formation and into contact with said resin a suitable catalyst for producing an acid set thereof, and allowing the mixture to set a predetermined length of time thereby allowing the polymerization of the resin and the stabilization of the sand.

14. A method of consolidating sands and other earthen formations containing carbonates or calcareous materials, comprising the steps of: preparing a liquid urea-formaldehyde resin, adding a predetermined amount of furfuryl alcohol to said resin, adding a predetermined amount of magnesium chloride to said resin and mixing therewith, said chloride being present in an amount sufficient for reducing acid reaction on the calcareous materials thereby enabling the acid-set resin to properly set, adding a predetermined amount of water to the resin mixture, introducing said mixture into the medium to be treated, introducing into the earthen formation and into contact with said resin a suitable catalyst for producing an acid set thereof, and allowing the mixture to set a predetermined length of time thereby allowing the polymerization of the resin and the stabilization of the sand.

15. A method of consolidating sands and other earthen formations containing carbonates or calcareous materials, comprising the steps of: preparing a liquid water-soluble acid-set resin, adding a predetermined amount of a chloride selected from the group consisting of magnesium chloride, calcium chloride and sodium chloride, and mixtures thereof to said liquid resin and mixing therewith, said chloride being present in an amount sufficient for reducing acid reaction on the calcareous materials thereby enabling the acid-set resin to properly set, adding a predetermined amount of water to the resin and chloride mixture, thereby forming a first solution, preparing a second solution containing a catalyst for producing an acid set of the resin, then mixing the first solution and the second solution together, subsequently injecting the resulting solution into the medium to be consolidated, and allowing the mixture to set a predetermined length of time thereby allowing the polymerization of the resin and the stabilization of the sand.

16. A method of consolidating sands and other earthen formations containing carbonates or calcareous materials, comprising the steps of: preparing a liquid urea-formaldehyde resin, adding a predetermined amount of furfuryl alcohol to said resin, adding a predetermined amount of magnesium chloride to said resin and mixing therewith, said chloride being present in an amount sufficient for reducing acid reaction on the calcareous materials thereby enabling the acid-set resin to properly set, adding a predetermined amount of water to the resin mixture, thereby forming a first solution, preparing a second solution containing a catalyst for producing an acid set of the resin, then mixing the first solution and the second solution together, subsequently injecting the resulting solution into the medium to be consolidated, and allowing the mixture to set a predetermined length of time thereby allowing the polymerization of the resin and the stabilization of the sand.

References Cited by the Examiner

UNITED STATES PATENTS 3,022,825   2/1962   Winsauer et al. _____ 166—33

JACOB L. NACKENOFF, Primary Examiner.

CHARLES E. O'CONNELL, Examiner.

T. A. ZALENSKI, Assistant Examiner.